(12) United States Patent
Cobb

(10) Patent No.: US 7,890,644 B2
(45) Date of Patent: Feb. 15, 2011

(54) PARALLEL TASKING APPLICATION FRAMEWORK

(75) Inventor: Jeff Cobb, Millbrae, CA (US)

(73) Assignees: Sony Corporation, Tokyo (JP); Sony Electronics Inc., Parkridge, NJ (US)

(*) Notice: Subject to any disclaimer, the term of this patent is extended or adjusted under 35 U.S.C. 154(b) by 221 days.

(21) Appl. No.: 12/350,201

(22) Filed: Jan. 7, 2009

(65) Prior Publication Data
US 2010/0174771 A1    Jul. 8, 2010

(51) Int. Cl.
*G06F 15/16*    (2006.01)
*G06F 12/00*    (2006.01)

(52) U.S. Cl. .................................. 709/229; 712/216

(58) Field of Classification Search ........... 709/203, 709/217–218, 227–229, 250; 712/216
See application file for complete search history.

(56) References Cited

U.S. PATENT DOCUMENTS

| | | | |
|---|---|---|---|
| 6,298,382 B1* | 10/2001 | Doi et al. | 709/229 |
| 7,318,092 B2* | 1/2008 | Sutler | 709/223 |
| 2002/0091747 A1* | 7/2002 | Rehg et al. | 709/107 |
| 2003/0191795 A1* | 10/2003 | Bernardin et al. | 709/105 |
| 2004/0078780 A1 | 4/2004 | Dutt et al. | |
| 2004/0098447 A1 | 5/2004 | Verbeke et al. | |
| 2005/0278708 A1 | 12/2005 | Zhao et al. | |
| 2006/0195336 A1 | 8/2006 | Greven et al. | |
| 2007/0083662 A1* | 4/2007 | Adams et al. | 709/229 |
| 2008/0052341 A1* | 2/2008 | Goggin | 709/201 |
| 2008/0120592 A1 | 5/2008 | Tanguay et al. | |
| 2009/0064162 A1* | 3/2009 | Amin | 718/104 |

OTHER PUBLICATIONS

Leo Modica, Clarity Communication Systems Inc. "Mobile apps should be developed with platform independence" http://www.mobilehandsetdesignline.com/showArticle.jhtml?articleID=181500399.
IBM "Porting Financial Markets Applications to the Cell Broadband Engine Architecure" http://www-03ibm.com/inducstries/financialservices/doc/content/bin/fss_applications_cell_broadband.pdf.
Laurence Nigay, Joelle Coutaz "A Design Space For Multimodal Systems: Concurrent Processing and Data Fusion" http://iihm.img.fr/bauchet/ICARE/InterCHI93_DataFusion.pdf.

* cited by examiner

*Primary Examiner*—Zarni Maung
(74) *Attorney, Agent, or Firm*—Trellis IP Law Group

(57) ABSTRACT

Particular embodiments generally relate to a parallel tasking framework. Network devices may use discovery messages to determine which services are being offered by different devices. The services provided using the framework allow parallel processing of tasks using modules found in devices. Distribution of modules from one of the devices to other devices may be provided to process a project, which may be any analysis that needs to be performed on data. A project may be made up of tasks that need to be performed where each task may process at least part of the data for the project. The parallel tasking framework allows a device to use processing resources from other devices when other devices are not using the full availability of their processing resources.

20 Claims, 5 Drawing Sheets

PARALLEL TASKING APPLICATION FRAMEWORK

BACKGROUND

Particular embodiments generally relate to a framework to allow parallel processing of tasks in an adaptable manner.

When there is a problem to be solved, a user may write a program for a specific type of machine. The machine can execute the program and perform analysis on certain chunks of data. However, the data processed is limited by resources of the machine. Also, multiple machines may be configured to process the chunks of data in parallel. However, the program needs to be written specially for the multiple machines to process the data. Writing a program for multiple machines takes an experienced programmer who is familiar with the configuration of the machines. This becomes complicated and is not useful for a user who does not understand how to write programs for processing on multiple machines.

SUMMARY

Particular embodiments generally relate to a parallel tasking framework. Network devices may use discovery messages to determine which services are being offered by different devices. The services provided using the framework allow parallel processing of tasks using modules found in devices. Distribution of modules from one of the devices to other devices may be provided to process a project, which may be any analysis that needs to be performed on data. A project may be made up of tasks that need to be performed where each task may process at least part of the data for the project.

The parallel tasking framework allows a device to use processing resources from other devices when other devices are not using the full availability of their processing resources. For example, a first device may not always be using its available processing resources during operation. In this case, a first device may determine that a task should be performed using a module. The target device may not have the module to perform the task. However, the first device can send the module to the target device because the framework allows modules to be transferred seamlessly. The target device may then install the module in the framework and the first device sends the applicable data to the target device for processing. The target device then processes the data to perform the task and can then send the result back to the first device.

By distributing data for different tasks among devices that have processing availability, a project may be performed efficiently. The user does not need to program the distribution of tasks. Rather, the framework allows a device to automatically make the decisions to distribute the tasks to devices with processing capabilities. Modules are written such that they can be distributed among devices, even devices with different architectures.

A further understanding of the nature and the advantages of particular embodiments disclosed herein may be realized by reference of the remaining portions of the specification and the attached drawings.

DETAILED DESCRIPTION OF EMBODIMENTS

Figure 1:
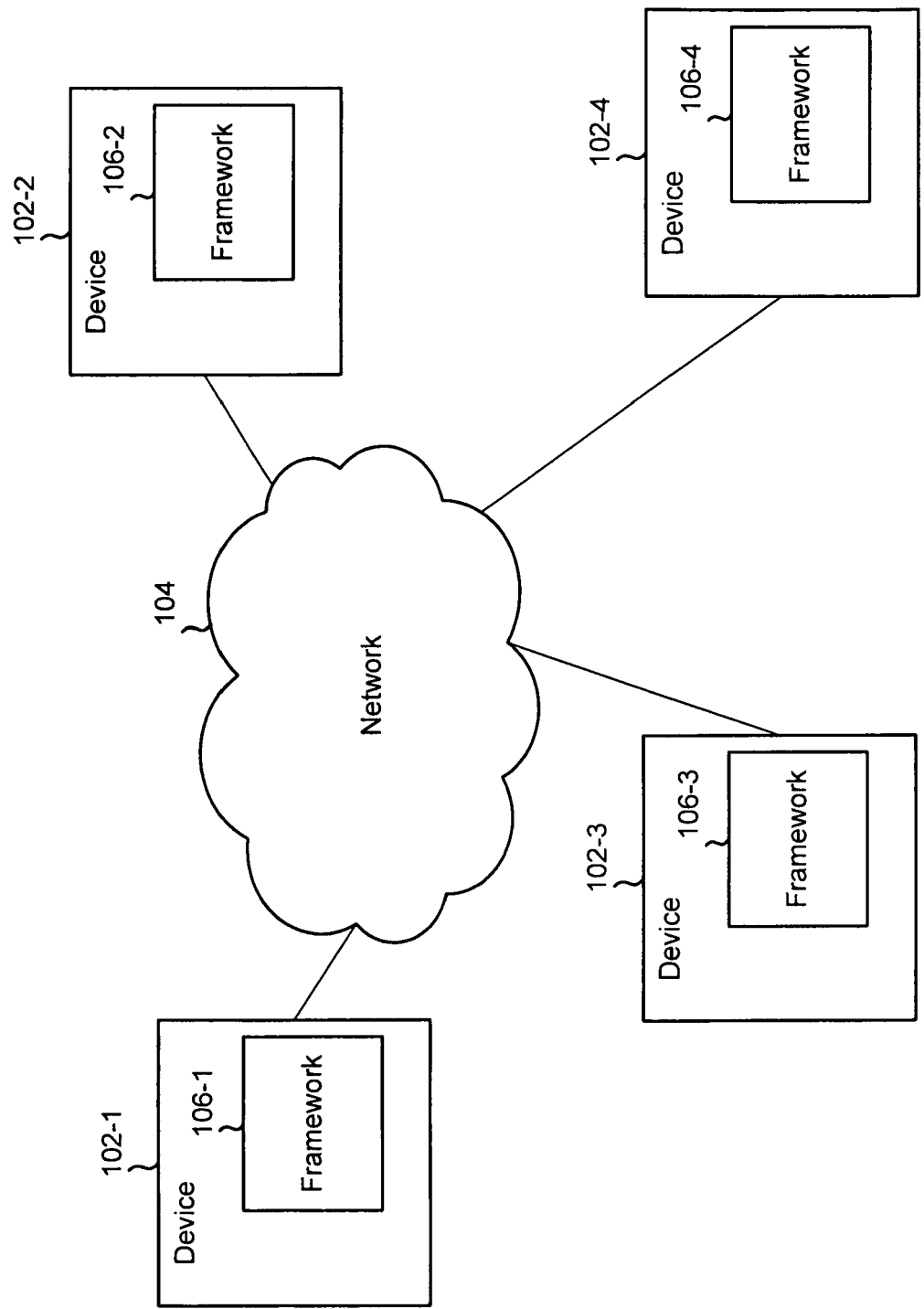
FIG. 1 depicts an example of a system for providing a parallel tasking framework according to one embodiment.

FIG. 1 depicts an example of a system 100 for providing a parallel tasking framework according to one embodiment. System 100 includes a plurality of computing devices 102 and a network 104. Each device 102 may include a framework 106 that allows parallel processing of tasks.

Devices 102 may include personal computers, laptop computers, cellular phones, personal digital assistants, cameras, access points, control points, servers, workstations, or other suitable computing devices. In one embodiment, various consumer electronic devices may connect to network 104. Network 104 may connect devices 102 together. In one example, network 104 may include a local area network (LAN), wide area network (WAN), or other wireless or wired networks.

Framework 106 may allow the parallel computation of tasks for a project. A project may be any series of computations that need to be performed. For example, a project may analyze a certain aspect of data.

Modules may be provided in framework 106 where modules can perform services. For example, modules may include general services, such as network connectivity, or other services, such as media players, music players, or other computational services. The modules may be plug-ins for framework 106. Plug-ins adhere to a format of an application programming interface (API) or an application binary interface (ABI). Users can write applications for using the API/ABI and do not have to consider which architecture the modules may be run on. For example, a module written for framework 106 may be run on a Linux™ machine, a Windows™ machine, Android™ machine, or other consumer electronics operating systems. The modules may be written in the framework, but not necessarily be compatible with the underlying architecture of the device. For example machine A is a PC and machine B is a game console. Machine A has modules compiled for an Intel architecture active but can maintain a small library of modules for other platforms (to the PC and the architecture itself, the modules may be considered binary blobs). When machine B reports during the discovery process to machine A, part of the identifying information is the architecture type. If machine B is on machine A's list of supported types, the whole bundle (if machine B is expected to further disseminate modules) or just the module for B's architecture is sent. If the whole bundle is sent (bundle=Win32/Linux/PS3/Android versions of the same functional module) then machine B can further support any architecture in the bundle. Also, machine B can use the module that is compatible with its architecture.

Computing devices 102 that include a framework 106 may communicate to exchange modules that are needed to perform services. Computing devices 102 seek out other computing devices 102 for coordination of work for projects. This may involve the distribution of different modules to different computing devices 102. If a computing device 102 has available processing resources, then a module may be distributed to that computing device 102. Data in a task may be sent to that computing device 102 for performing of the task. In this way, computing devices 102 may distribute work among other computing devices that have available processing resources. This increases the efficiency of computing devices 102 in network 104 by allowing the automatic coordination of performing tasks for a project.

The following description shows different stages of using the framework to process a project. The first stage is start-up where devices discover each other's abilities. Then, devices may exchange modules to allow services to be distributed. The performing of tasks for a project is then described.

Figure 2:
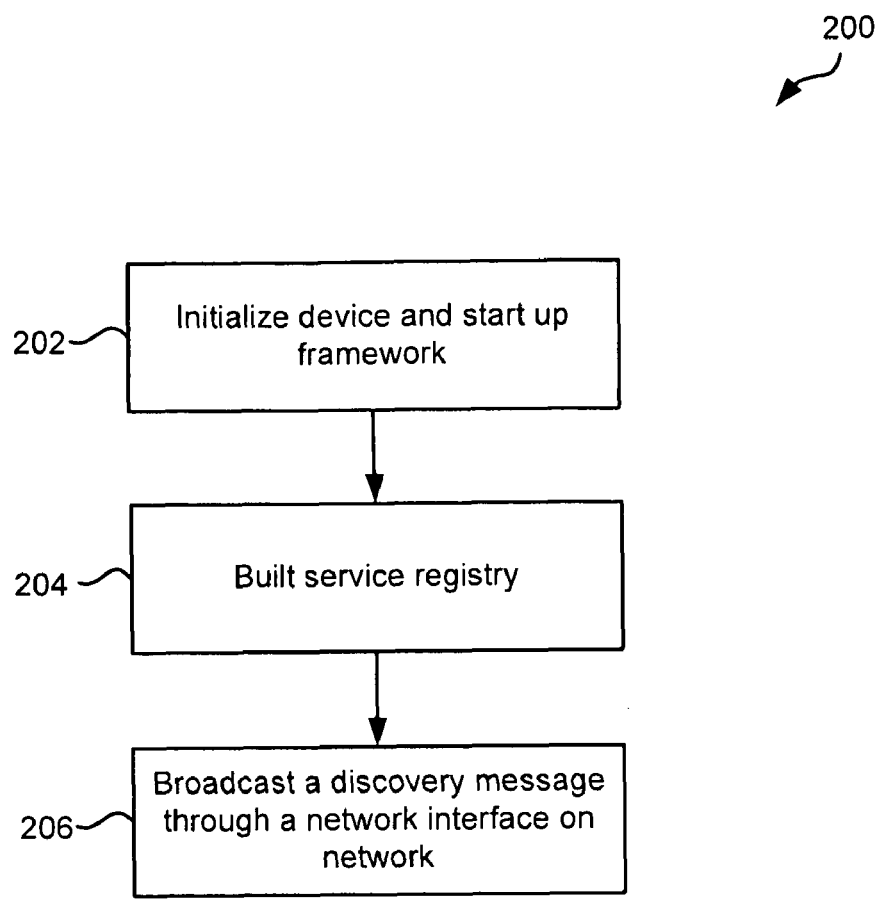
FIG. 2 depicts an example of a flowchart for initializing computing devices according to one embodiment.

FIG. 2 depicts an example of a flowchart 200 for initializing computing devices 102 according to one embodiment. In step 202, a first computing device 102-1 is initialized and framework 106 is started up. For example, first computing device 102-1 may connect to network 104. Upon powering on or initialization of framework 106, modules are loaded and initialized.

In step 204, a service registry is built. This lists the types of services that first computing device 102-1 has available.

In step 206, first computing device 102-1 then broadcasts a discovery message through a network interface on network 104. The discovery message includes information about the computing device, such as the services available, architecture (e.g. Linux, x86) and other information.

Figure 3:
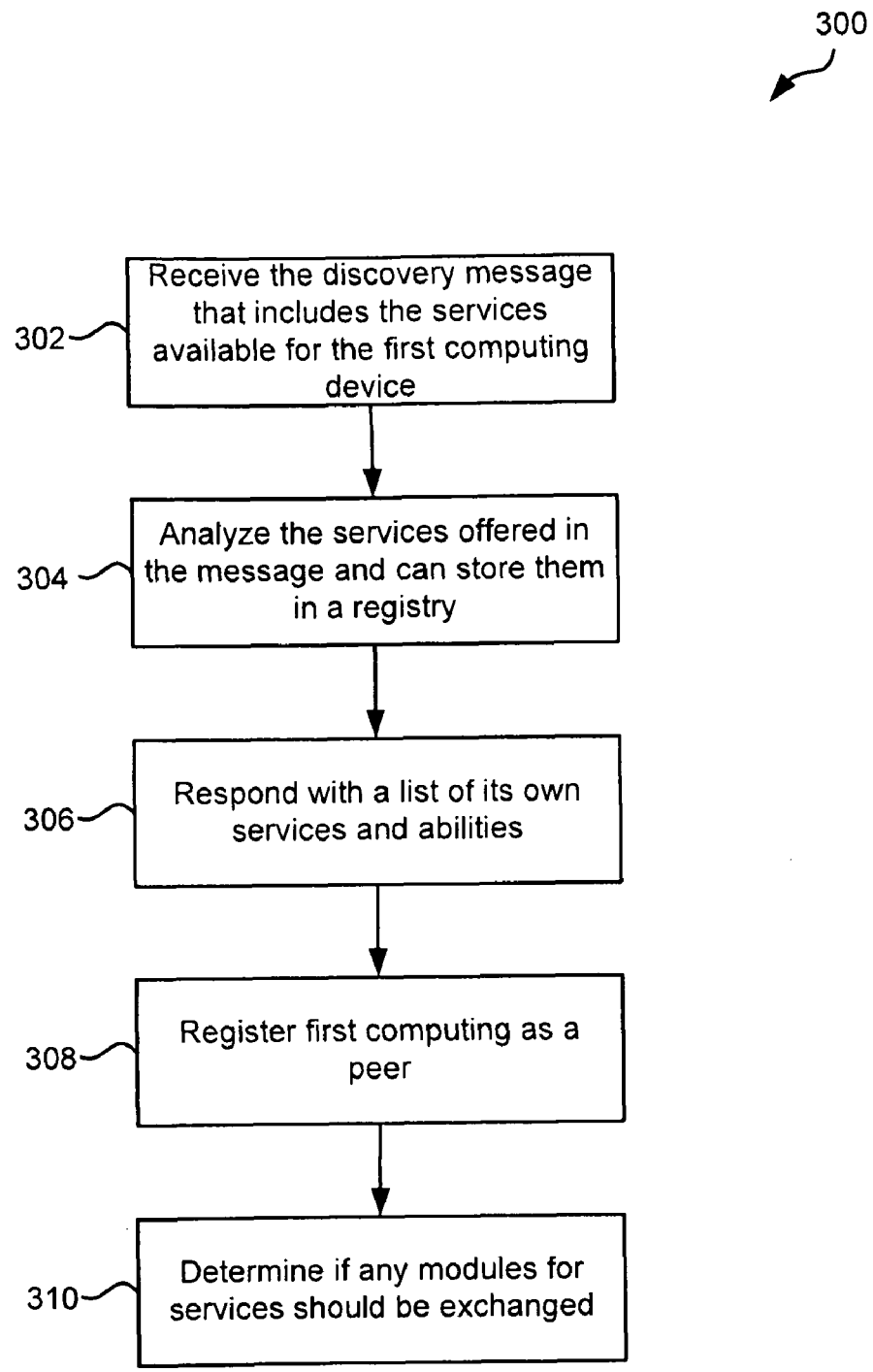
FIG. 3 depicts an example of a simplified flowchart of a method for actions performed when a computing device receives a discovery message according to one embodiment.

A computing device on the network may then receive the discovery message. FIG. 3 depicts an example of a simplified flowchart 300 of a method for actions performed when a computing device 102 receives a discovery message according to one embodiment. In step 302, a second computing device 102-2 receives the discovery message that includes the services available for the first computing device 102-1.

In step 304, second computing device 102-2 analyzes the services offered in the message and can store them in a registry. For example, second computing device 102-2 can keep track of services offered by all computing devices 102 in a network. Second computing device 102 can decide to not keep track of certain services that are not compatible. For example, a camera would not be able to use a music player may not list it as an available service. However, all the services that are offered on the network may be kept track of even if they are not compatible. This allows second computing device to communicate what services other devices are offering.

In step 306, second computing device 102-2 responds with a list of its own services and abilities. For example, second computing device 102-2 may send a discovery message that includes the services available and its architecture.

In step 308, second computing device 102-2 registers first computing device 102-1 as a peer. Registering a device as a peer allows it to use first computing device 102-1 for computation of parallel tasks at a later time.

In step 310, second computing device 102-2 and conversely first computing device 102-1 determine if any modules for services should be exchanged. For example, if one of first computing device's 102-1 services is desired by second computing device 102-2, then second computing device 102-2 may request that module. Also, first computing device 102-1 may request a module that could be used on its architecture.

Figure 4:
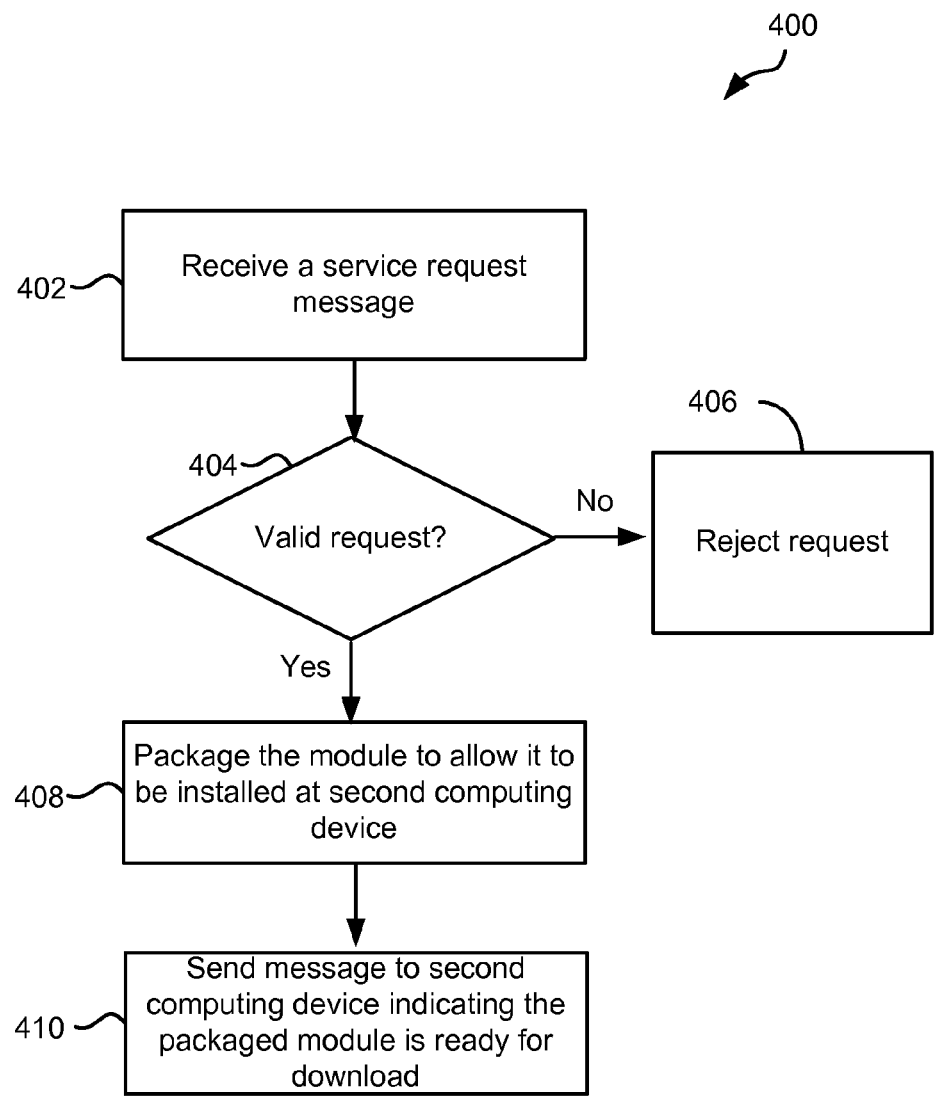
FIG. 4 depicts a simplified flowchart of a method for exchanging modules according to one embodiment.

If exchange of modules is needed, the process of FIG. 4 is performed. FIG. 4 depicts a simplified flowchart 400 of a method for exchanging modules according to one embodiment. In step 402, first computing device 102-1 receives a service request message. For example, a service of a media player may be requested from first computing device 102-1 after it sends its discovery message listing the services it offers.

In step 404, first computing device 102-1 determines if the request is a valid request. For example, authentication of second computing device 102-2 may be performed. This may involve determining if second computing device 102-2 is in a network of trusted machines. For example, a certificate may be analyzed to determine if second computing device 102-2 should be trusted. Other methods of authenticating second computing device 102-2 may be appreciated.

First computing device 102-1 may also determine if the module can be executed on second computing device 102-2. This may involve analyzing the architecture of second computing device 102-2. However, as discussed above, first computing device 102-1 may have multiple modules that can be executed on different architectures. A module that can execute on second computing device 102-2 may be determined.

If the request is not valid, in step 406, it is rejected. In step 408, first computing device 102-1 packages the module for installation at second computing device 102-2. Also, a group of modules may be packaged, such as a group of modules for different architectures. This allows second computing device 102-2 to be a distributor of modules when communicating with other devices. Packaging the module includes a configuration file informing second computing device 102-2 of any needed download information. A configuration file of an extensible mark-up language (XML) file and a path to a needed file, temporary credentials to allow access, and a library that is used for the architecture may be sent. This allows a device with a framework 106 to download and install the module. In step 410, a message is sent to second computing device 102-2 indicating the packaged module is ready for download.

Second computing device 102-2 receives the download message and can then download the component from first computing device 102-1. For example, a network layer may coordinate the transfer with first computing device 102-1. In this case, a machine-to-machine handshaking and file transfer via secure shell (SSH) may be performed for the packaged module. After the packaged module is downloaded, it can be installed based on the configuration and download information. Once the module is installed, the service may be added to its service registry and also a new message may be broadcast on network 104 indicating that the new service is available.

Figure 5:
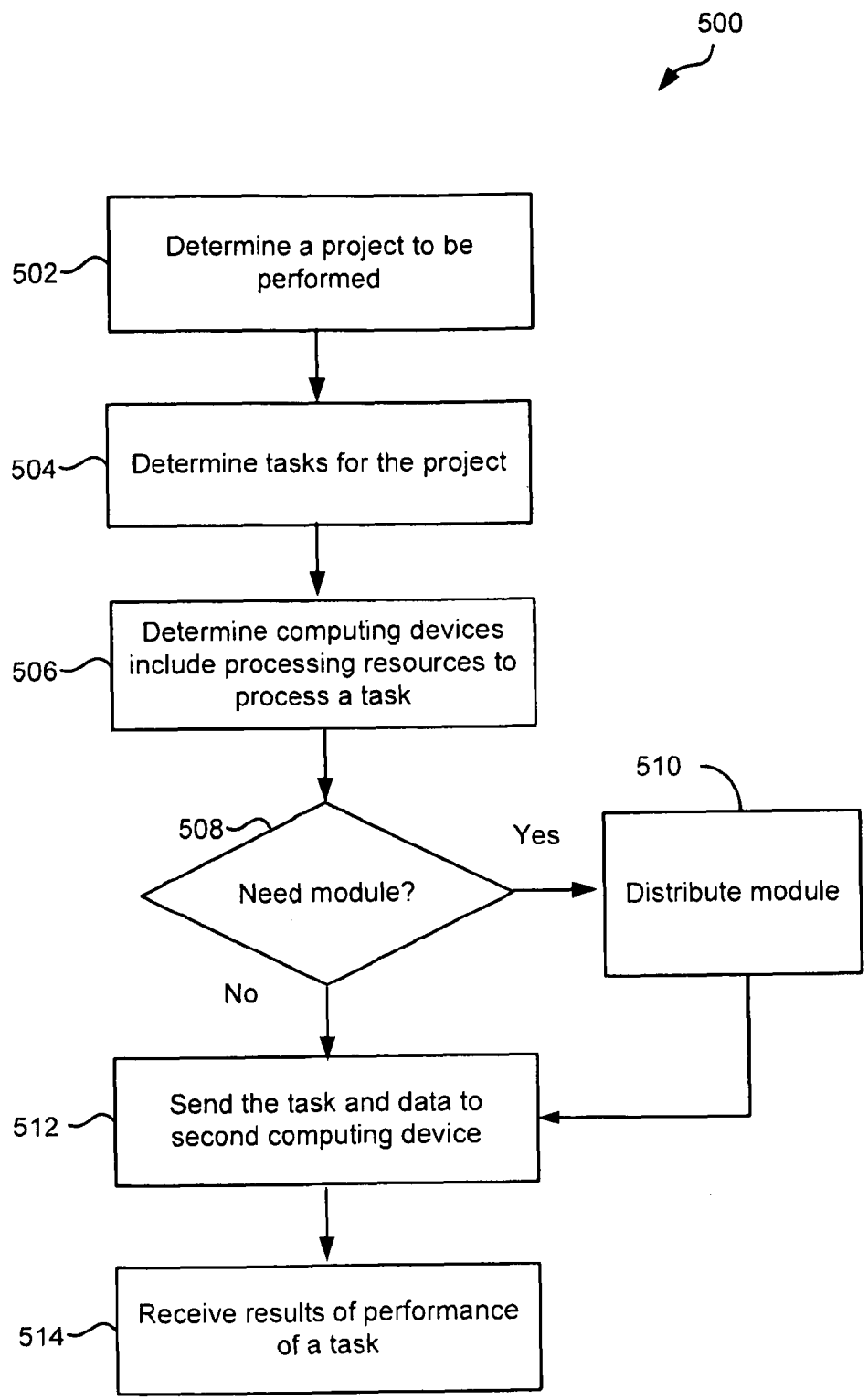
FIG. 5 depicts a simplified flowchart of a method for providing parallel performance of tasks according to one embodiment.

Once the discovery of peer devices is performed, the parallel performing of tasks may be provided. FIG. 5 depicts a simplified flowchart 500 of a method for providing parallel performance of tasks according to one embodiment. In step 502, first computing device 102-1 determines a project to be performed. The project may be any analysis that may need to be performed on data. The project may include a number of tasks or may be broken into a number of tasks that can be performed.

In step 504, first computing device 102-1 determines tasks for the project. For example, the project may be analyzed to determine which tasks can be performed by other computing devices 102. The service registry and peer list may be analyzed. This may determine which services are offered by other computing devices 102. Also, the peer list may indicate the abilities of other computing devices 102, such as what tasks they can handle. For example, a Linux machine may be able to handle computationally-intensive tasks. Also, a Playstation 3 (PS3) may be able to handle graphically intensive tasks because the PS3 has a powerful graphics processor in it. A programmer does not need to program how to break the project down into tasks. Rather, first computing device 102-1 analyzes the project and determines tasks that can be broken out from the project based on its peer list and the services offered by the peers. This determination may be performed dynamically as processing power and abilities that are available on the network change.

A programmer does not need to know exactly how the problem is to be distributed but conceptually decompose the problem domain with a fine-enough granularity so that the smallest-expected device can participate in the problem-solving process. This is only needed if the problem or data does not fit a generalized model. For example, a model may be data for a project may not need to follow any segmentation rules or restrictions. Thus, the data can be broken up in any way. Also, another model may be data can be broken up in a certain way. The programmer can then specify the data falls within this model. The programmer can also specify segmentation restrictions as to how the data should be broken up, such as the data should not be broken into sizes less than a certain size, the data should be segmented to keep certain data together, etc.

For a simplified example, there is a body of data X comprised of many gigabytes of information. The task to solve is to search this body of data for specific patterns (could be disease signatures in physiological data). The programmer may provide the data and 1-n modules (1 for each expected supported platform, same code, just recompiled for different targets) with the abstracted logic of how to search and what to search for.

If a device then appears that can handle any sized data, an arbitrary amount of data and the accompanying module is distributed to that other device. If, however, a device that has certain processing restrictions, such as a PDA or other constrained device enters the network that can only handle (for example) a megabyte of data at a time, the first computing device would give a larger block of data to a personal computer than the PDA. As each device finishes processing the data, the results are returned and the next block of data is assigned. This process works as long as there are no domain-related reasons for segmenting the data along specific lines. That is, the first computing device can segment the data in any way and can segment it dynamically based on which devices are available and what their processing capabilities are. If, however, the natural order of the data is such that only more powerful devices can work on it, the devices that cannot handle large amounts of data are not given work. In this case, the programmer may define the pattern-detection code and the data block dissemination code to configure guidelines on minimum/maximum data block sizes. The first computing device may read the guidelines and determine how to break up the data. Also, the first computing device may analyze the data and the task that needs to be performed and break of the data in the most efficient way determined. In either case, the first computing device makes sure only units of work are distributed in alignment with the needs of the problem domain.

In step 506, first computing device 102-1 determines computing devices 102 include processing resources to process a task. This may involve polling other computing devices 102 to determine if processing resources is available. For example, a message may be sent to other devices 102 and a response may be received indicating if processing resources are available. Processing resources may be available if a device is not operating above a certain threshold. For example, if the processor is at a 60% utilization, then the computing device may indicate that it has 40% processing resources available.

In step 508, first computing device 102-1 determines if computing devices 102 need a module to perform one of the tasks. If so, step 510 facilitates distribution of the module. For example, the module may be distributed as described above with respect to FIG. 4. Accordingly, when first computing device 102-1 determines that a task can be performed, a module may be distributed.

If a module does not need to be distributed or after the module has been distributed, in step 512, first computing device 102-1 then sends the task and data to second computing device 102-2. For example, the algorithm needed is packaged in a module and sent with data to have the computation performed. In one example, once second computing device 102-2 has been given the module with the problem-solving algorithm (a pattern detection algorithm as described above) a message is sent to the second computing device 102-2 to perform a task. In a single-purpose model in which second computing device 102-2 knows which task and how to perform the task, this message may be all that is needed to trigger the work. Contained within the message to perform the task is the information needed to either access a shared data repository on a network or where to download the data segment needed for the task. Upon receipt of this message, the target machine either downloads or references a shared resource, performs the task, and forwards the results back to the master machine along with a flag indicating continued or discontinued computational availability. If the target machine is still available, the next block of data is assigned via the next task message with references to the body of data to be processed. Although one computing device is described as being communicated with, it will be understood that any number of computing devices 102 may receive a task and perform computations on portions of the data.

In step 514, first computing device 102-1 receives results of performance of a task. Because tasks are being performed by many different devices, in step 516, first computing device 102-1 may integrate the results back into the project. For example, different results for different tasks may be received from different computing devices 102. First computing device 102-1 may coordinate how the results of the different tasks interrelate to solve the problem for the project.

Different examples will now be described. It will be understood that other examples may be contemplated. In one example, a researcher with a small server farm of computing devices 102 could set up the problem with the data needed on a device 102-1. The problem can be replicated across the network such that any devices running framework 106 can be updated cold (just file copy) or hot (components can be hot-swapped). When the tasks are sent, these devices can go from doing protein research to geological research.

In another example, devices A-F on the network are processing a problem and each device feeds results to the following device which processes it and sends it on to the next (i.e., A feeds B feeds C and so on.) The output of F is the "answer". Workflow needs to be written for all six machines to process the data conventionally. However, particular embodiments allow device F to automatically determine which devices have available processing resources and F can coordinate the distribution of tasks. Device F can change configuration/settings on 1-n of the systems, set up the data on A, and rerun the process. If the same problem is running, a component on F can examine results and through the peer to peer mechanism make changes to the preceding five machines, reset and rerun the test itself, only bothering a human when done.

Although the description has been described with respect to particular embodiments thereof, these particular embodiments are merely illustrative, and not restrictive. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for processing data, the method comprising:
receiving one or more discovery messages including services found on one or more networked devices, the services provided in a framework allowing parallel processing of tasks using modules compatible with the framework;
determining a project in which data should be processed;
determining one of the networked devices that has processing resources to perform a service for the project, the service determined to be able to perform a task in processing at least a part of the data for the project;
distributing a module from the framework for the service to the one of the networked devices; and
distributing data for the task to the one of the networked devices, the one of the networked devices processing the data using the module for the project.

2. The method of claim 1, further comprising:
storing the services found on the one or more networked devices in a registry; and
analyzing the services in the registry to determine which of the one or more networked devices is capable of performing the task for the projects using a service.

3. The method of claim 1, further comprising:
determining a service found on a network device in the one or more networked devices that can be transferred to the first device; and
sending a request of the service to the network device.

4. The method of claim 1, further comprising:
detecting a new device on the network;
determining if the new device has processing resources; and
distributing a second task to the new device if the new device has available processing resources.

5. The method of claim 1, wherein the one or more networked devices include the framework, which allows distribution of modules among the one or more networked devices.

6. The method of claim 1, further comprising:
polling the one or more network devices dynamically to determine available processing resources; and
analyzing the project to determine the one of the networked devices to perform the task based on the dynamically determined available processing resources.

7. The method of claim 6, wherein the one of the networked devices is selected based on capabilities included in the one of the networked devices.

8. The method of claim 1, further comprising:
determining if the data includes segmentation restrictions; and
if the data includes segmentation restrictions, segmenting the data into a data unit based on the segmentation restrictions and the one of the networked devices such that the segmentation restrictions are not violated.

9. The method of claim 8, further comprising if the data does not include segmentation restrictions, segmenting the data based on the capabilities of the one of the networked devices.

10. The method of claim 1, wherein the modules comprises modules that are compatible with multiple computing architectures, wherein a module compatible with the one of the networked devices is sent to the one of the networked devices.

11. An apparatus comprising:
one or more processors; and
logic encoded in one or more computer-readable media for execution by the one or more processors and when executed operable to:
receive one or more discovery messages including services found on one or more networked devices, the services provided in a framework allowing parallel processing of tasks using modules compatible with the framework;
determine a project in which data should be processed;
determine one of the networked devices that has processing resources to perform a service for the project, the service determined to be able to perform a task in processing at least a part of the data for the project;
distribute a module from the framework for the service to the one of the networked devices; and
distribute data for the task to the one of the networked devices, the one of the networked devices processing the data using the module for the project.

12. The apparatus of claim 11, wherein the logic when executed is further operable to:
store the services found on the one or more networked devices in a registry; and analyze the services in the registry to determine which of the one or more networked devices is capable of performing the task for the projects using a service.

13. The apparatus of claim 11, wherein the logic when executed is further operable to:
  determine a service found on a network device in the one or more networked devices that can be transferred to the first device; and
  send a request of the service to the network device.

14. The apparatus of claim 11, wherein the logic when executed is further operable to:
  detect a new device on the network;
  determine if the new device has processing resources; and
  distribute a second task to the new device if the new device has available processing resources.

15. The apparatus of claim 11, wherein the one or more networked devices include the framework, which allows distribution of modules among the one or more networked devices.

16. The apparatus of claim 11, wherein the logic when executed is further operable to:
  poll the one or more network devices dynamically to determine available processing resources; and
  analyze the project to determine the one of the networked devices to perform the task based on the dynamically determined available processing resources.

17. The apparatus of claim 16, wherein the one of the networked devices is selected based on capabilities included in the one of the networked devices.

18. The apparatus of claim 11, wherein the logic when executed is further operable to:
  determine if the data includes segmentation restrictions; and
  if the data includes segmentation restrictions, segment the data into a data unit based on the segmentation restrictions and the one of the networked devices such that the segmentation restrictions are not violated.

19. The apparatus of claim 18, wherein the logic when executed is further operable to if the data does not include segmentation restrictions, segment the data based on the capabilities of the one of the networked devices.

20. A system for processing data, the method comprising:
  a plurality of target computing devices, wherein each of the target computing devices include different processing resources; and
  a master computing device configured to:
  receive one or more discovery messages including services found on the plurality of target computing devices, the services provided in a framework allowing parallel processing of tasks using modules compatible with the framework;
  determine a project in which data should be processed;
  determine processing resources available in the plurality of target computing devices to perform one or more services for the project, the one or more services determined to be able to perform one or more tasks in processing at least a part of the data for the project;
  distribute a module in the one or more modules from the framework for a service to each of the plurality of target computing devices; and
  distribute data for a task to each of the plurality of target computing devices, wherein each of the plurality of target computing devices processes the data distributed using the distributed module for the project.

* * * * *

UNITED STATES PATENT AND TRADEMARK OFFICE
CERTIFICATE OF CORRECTION

| | | |
|---|---|---|
| PATENT NO. | : 7,890,644 B2 | |
| APPLICATION NO. | : 12/350201 | |
| DATED | : February 15, 2011 | |
| INVENTOR(S) | : Jeff Cobb | |

It is certified that error appears in the above-identified patent and that said Letters Patent is hereby corrected as shown below:

In claim 20 Column 10 Line 9: AFTER "data," DELETE "the method" INSERT --the system--

Signed and Sealed this
Fourth Day of October, 2011

David J. Kappos
*Director of the United States Patent and Trademark Office*